United States Patent
Zhang et al.

(10) Patent No.: US 10,460,655 B2
(45) Date of Patent: Oct. 29, 2019

(54) GAMMA TUNING METHOD AND GAMMA TUNING DEVICE

(71) Applicants: BOE TECHNOLOGY GROUP CO., LTD., Beijing (CN); ORDOS YUANSHENG OPTOELECTRONICS CO., LTD., Inner Mongolia Autonomous Region (CN)

(72) Inventors: Chang Zhang, Beijing (CN); Kwanggyun Jang, Beijing (CN); Jing Liu, Beijing (CN); Zhiguang Zhang, Beijing (CN); Hualing Yang, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

(*) Notice: Subject to any disclaimer, the term of this patent is extended or adjusted under 35 U.S.C. 154(b) by 0 days.

(21) Appl. No.: 15/547,236

(22) PCT Filed: Feb. 28, 2017

(86) PCT No.: PCT/CN2017/075128
§ 371 (c)(1),
(2) Date: Jul. 28, 2017

(87) PCT Pub. No.: WO2017/190545
PCT Pub. Date: Nov. 9, 2017

(65) Prior Publication Data
US 2019/0051235 A1    Feb. 14, 2019

(30) Foreign Application Priority Data
May 5, 2016 (CN) .......................... 2016 1 0292597

(51) Int. Cl.
G09G 3/3225 (2016.01)
H04N 9/69 (2006.01)
(Continued)

(52) U.S. Cl.
CPC ............. *G09G 3/3225* (2013.01); *H04N 1/60* (2013.01); *H04N 5/202* (2013.01); *H04N 9/69* (2013.01);
(Continued)

(58) Field of Classification Search
CPC ... G09G 2320/0276; G09G 2320/0673; H04N 5/202; H04N 9/69
See application file for complete search history.

(56) References Cited

U.S. PATENT DOCUMENTS 8,279,351 B2 * 10/2012 Bakhmutsky ............ H04N 9/69
345/589
8,456,482 B2 * 6/2013 Furui ..................... G09G 5/003
345/581
(Continued)

FOREIGN PATENT DOCUMENTS

CN    101046567 A    10/2007
CN    101546509 A     9/2009
(Continued)

OTHER PUBLICATIONS

First Office Action for Chinese Application No. 201610292597.0, dated Oct. 24, 2017, 9 Pages.
(Continued)

*Primary Examiner* — Gene W Lee
(74) *Attorney, Agent, or Firm* — Brooks Kushman P.C.

(57) ABSTRACT

The present disclosure provides a gamma tuning method and a gamma tuning device. The gamma tuning method includes steps of: comparing grayscale binding points of a to-be-debugged module with a standard gamma curve; determin-
(Continued)

ing a to-be-tuned grayscale binding point from the grayscale binding points of the to-be-debugged module in accordance with a comparison result between the grayscale binding points of the to-be-debugged module and the standard gamma curve; and tuning a grayscale brightness value of the to-be-tuned grayscale binding point in accordance with a target brightness value of the grayscale binding point on the standard gamma curve.

19 Claims, 6 Drawing Sheets

(51) Int. Cl.
*H04N 1/60* (2006.01)
*H04N 5/202* (2006.01)

(52) U.S. Cl.
CPC .......... *G09G 2320/0276* (2013.01); *G09G 2320/0673* (2013.01)

(56) References Cited

U.S. PATENT DOCUMENTS

| | | | |
|---|---|---|---|
| 9,299,282 B2* | 3/2016 | Oh | G09G 3/20 |
| 2007/0047033 A1* | 3/2007 | Furui | G09G 5/003 358/519 |
| 2009/0256935 A1 | 10/2009 | Endo et al. | |
| 2013/0120659 A1 | 5/2013 | Park et al. | |
| 2014/0184480 A1* | 7/2014 | Lee | G09G 3/3208 345/82 |
| 2014/0184654 A1* | 7/2014 | Lee | G09G 3/3233 345/690 |
| 2014/0198134 A1* | 7/2014 | Moon | G09G 5/10 345/690 |
| 2015/0179103 A1* | 6/2015 | Tani | G09G 3/20 345/690 |

FOREIGN PATENT DOCUMENTS

| | | |
|---|---|---|
| CN | 202796008 U | 3/2013 |
| CN | 103985333 A | 8/2014 |
| CN | 105096896 A | 11/2015 |
| CN | 105138185 A | 12/2015 |
| CN | 105741775 A | 7/2016 |

OTHER PUBLICATIONS

International Search Report and Written Opinion for Application No. PCT/CN2017/075128, dated Apr. 28, 2017, 9 Pages.
Second Office Action for Chinese Application No. 201610292597.0, dated Jun. 14, 2018, 11 Pages.

* cited by examiner

US 10,460,655 B2

GAMMA TUNING METHOD AND GAMMA TUNING DEVICE

CROSS-REFERENCE TO RELATED APPLICATIONS

This application is the U.S. national phase of PCT Application No. PCT/CN2017/075128 filed on Feb. 28, 2017, which claims priority to Chinese Patent Application No. 201610292597.0 filed on May 5, 2016, the disclosures of which are incorporated in their entirety by reference herein.

TECHNICAL FIELD

The present disclosure relates to the field of display technology, in particular a gamma tuning method and a gamma tuning device.

BACKGROUND

Currently, there is an obvious difference between Active-Matrix Organic Light-Emitting Diode (AMOLED) modules, so it is necessary to perform gamma tuning on each module. During the mass production, it is no longer realistic to perform the gamma tuning manually.

Manufacturers are searching for an automatic gamma tuning method. In the case of debugging each module, a conventional automatic gamma tuning device may tune all grayscale binding points in accordance with characteristics of corresponding driver integrated circuit (IC). In this regard, during the mass production, a large amount of repetitive works need to be performed. This is because, during the actual debugging procedure, grayscale values at many grayscale binding points may be acceptable. In addition, the difference between the modules may decrease gradually along with the development of the technology, and in the case that the above-mentioned tuning method is adopted, there will still be a large amount of repetitive works, resulting in a waste of time as well as low production efficiency.

SUMMARY

In one aspect, the present disclosure provides in some embodiments a gamma tuning method, including steps of: comparing grayscale binding points of a to-be-debugged module with a standard gamma curve; determining a to-be-tuned grayscale binding point from the grayscale binding points of the to-be-debugged module in accordance with a comparison result between the grayscale binding points of the to-be-debugged module and the standard gamma curve; and tuning a grayscale brightness value of the to-be-tuned grayscale binding point in accordance with a target brightness value of the grayscale binding point on the standard gamma curve.

In a possible embodiment of the present disclosure, the comparison result includes that the to-be-tuned grayscale binding point is inconsistent with a corresponding grayscale binding point on the standard gamma curve.

In a possible embodiment of the present disclosure, the step of comparing the grayscale binding points of the to-be-debugged module with the standard gamma curve includes: comparing grayscale brightness values of the grayscale binding points of the to-be-debugged module with corresponding brightness values on the standard gamma curve, or comparing a gamma curve of the to-be-debugged module with the standard gamma curve, the gamma curve of the to-be-debugged module being created on the basis of the grayscale binding points of the to-be-debugged module.

In a possible embodiment of the present disclosure, the step of tuning the grayscale brightness value of the to-be-tuned grayscale binding point in accordance with the target grayscale brightness value of the grayscale binding point on the standard gamma curve includes: tuning, in accordance with the target grayscale brightness value of the grayscale binding point on the standard gamma curve, the grayscale brightness value of the to-be-tuned grayscale binding point on the gamma curve of the to-be-tuned module in an iterative mode where the grayscale brightness value gradually approaches to the target grayscale brightness value.

In a possible embodiment of the present disclosure, the step of tuning, in accordance with the target grayscale brightness value of the grayscale binding point on the standard gamma curve, the grayscale brightness value of the to-be-tuned grayscale binding point on the gamma curve of the to-be-debugged module in the iterative mode where the grayscale brightness value gradually approaches to the target grayscale brightness includes: tuning the grayscale brightness value of the to-be-tuned grayscale binding point on the gamma curve of the to-be-debugged module; comparing the tuned grayscale brightness value of the grayscale binding point with the target grayscale brightness value of the grayscale binding point on the standard gamma curve; and in the case that the tuned grayscale brightness value is inconsistent with the target grayscale brightness value, tuning the tuned grayscale brightness value gradually in accordance with the target grayscale brightness value, until the grayscale brightness value of the grayscale binding point is consistent with the target grayscale brightness value.

In a possible embodiment of the present disclosure, the step of acquiring the gamma curve of the to-be-debugged module includes: performing white balance tuning on the to-be-debugged module; and acquiring an R-component gamma curve, a G-component gamma curve and a B-component gamma curve of the to-be-debugged module after the white balance tuning.

In a possible embodiment of the present disclosure, the step of acquiring the R-component gamma curve, the G-component gamma curve and the B-component gamma curve of the to-be-debugged module after the white balance tuning includes: determining a picture in accordance with characteristic data of a driver IC of the to-be-debugged module, and reading from the picture a grayscale brightness value of a R component, a grayscale brightness value of a G component and a grayscale brightness value of a B component, the picture containing the grayscale brightness values of the respective grayscale binding points corresponding to the driver IC of the to-be-debugged module; and generating the R-component gamma curve, the G-component gamma curve and the B-component gamma curve of the to-be-debugged module in accordance with the grayscale brightness value of the R component, the grayscale brightness value of the G component and the grayscale brightness value of the B component.

In a possible embodiment of the present disclosure, the picture includes a monochromatic R region, a monochromatic G region and a monochromatic B region, and grayscale pictures of the grayscale binding points corresponding to the driver IC are arranged at the R region, the G region and the B region respectively.

In a possible embodiment of the present disclosure, the step of comparing the gamma curve of the to-be-debugged module with the standard gamma curve includes: comparing the R-component gamma curve, the G-component gamma curve and the B-component gamma curve of the to-be-debugged module with a standard R-component gamma curve, a standard G-component gamma curve and a standard B-component gamma curve of the standard gamma curve respectively, the standard R-component gamma curve, the standard G-component gamma curve and the standard B-component gamma curve each having a gamma value of 2.2.

In a possible embodiment of the present disclosure, prior to the step of comparing the gamma curve of the to-be-debugged module with the standard gamma curve, the gamma tuning method further includes: collecting the characteristic data of the driver IC of the to-be-debugged module; and creating the standard gamma curve in accordance with the collected characteristic data of the driver IC of the to-be-debugged module.

In a possible embodiment of the present disclosure, an absolute value of a difference between the tuned grayscale brightness value of the grayscale binding point and the target grayscale brightness value is smaller than or equal to a threshold, or an absolute value of a square of the difference between the tuned grayscale brightness value of the grayscale binding point and the target grayscale brightness value is smaller than or equal to a threshold.

In a possible embodiment of the present disclosure, the gamma tuning method further includes: performing a programming operation on the module after the gamma tuning.

In another aspect, the present disclosure provides in some embodiments a gamma tuning device, including a memory and a processor. The memory is configured to store therein computer-readable instructions. The processor is configured to execute the computer-readable instructions stored in the memory, so as to compare grayscale binding points of a to-be-debugged module with a standard gamma curve; determine a to-be-tuned grayscale binding point from the grayscale binding points of the to-be-debugged module in accordance with a comparison result between the grayscale binding points of the to-be-debugged module and the standard gamma curve; and tune a grayscale brightness value of the to-be-tuned grayscale binding point in accordance with a target brightness value of the grayscale binding point on the standard gamma curve.

In a possible embodiment of the present disclosure, the comparison result comprises that the to-be-tuned grayscale binding point is inconsistent with a corresponding grayscale binding point on the standard gamma curve.

In a possible embodiment of the present disclosure, the processor is further configured to compare grayscale brightness values of the grayscale binding points of the to-be-debugged module with corresponding brightness values on the standard gamma curve, or compare a gamma curve of the to-be-debugged module with the standard gamma curve, the gamma curve of the to-be-debugged module being created on the basis of the grayscale binding points of the to-be-debugged module.

In a possible embodiment of the present disclosure, the processor is further configured to: tune, in accordance with the target grayscale brightness value of the grayscale binding point on the standard gamma curve, the grayscale brightness value of the to-be-tuned grayscale binding point on the gamma curve of the to-be-debugged module in an iterative mode where the grayscale brightness value gradually approaches to the target grayscale brightness value.

In a possible embodiment of the present disclosure, the processor is further configured to: tune the grayscale brightness value of the to-be-tuned grayscale binding point on the gamma curve of the to-be-debugged module; compare the tuned grayscale brightness value of the grayscale binding point with the target grayscale brightness value of the grayscale binding point on the standard gamma curve; and in the case that the tuned grayscale brightness value is inconsistent with the target grayscale brightness value, tune the tuned grayscale brightness value gradually in accordance with the target grayscale brightness value, until the grayscale brightness value of the grayscale binding point is consistent with the target grayscale brightness value.

In a possible embodiment of the present disclosure, the processor is further configured to: perform white balance tuning on the to-be-debugged module; and acquire an R-component gamma curve, a G-component gamma curve and a B-component gamma curve of the to-be-debugged module after the white balance tuning.

In a possible embodiment of the present disclosure, the processor is further configured to: determine a picture in accordance with characteristic data of a driver IC of the to-be-debugged module, and read from the picture a grayscale brightness value of a R component, a grayscale brightness value of a G component and a grayscale brightness value of a B component, the picture containing the grayscale brightness values of the respective grayscale binding points corresponding to the driver IC of the to-be-debugged module; and generate the R-component gamma curve, the G-component gamma curve and the B-component gamma curve of the to-be-debugged module in accordance with the grayscale brightness value of the R component, the grayscale brightness value of the G component and the grayscale brightness value of the B component.

In a possible embodiment of the present disclosure, the picture includes a monochromatic R region, a monochromatic G region and a monochromatic B region, and grayscale pictures of the grayscale binding points corresponding to the driver IC are arranged at the R region, the G region and the B region respectively.

In a possible embodiment of the present disclosure, the processor is further configured to compare the R-component gamma curve, the G-component gamma curve and the B-component gamma curve of the to-be-debugged module with a standard R-component gamma curve, a standard G-component gamma curve and a standard B-component gamma curve of the standard gamma curve respectively, and the standard R-component gamma curve, the standard G-component gamma curve and the standard B-component gamma curve each having a gamma value of 2.2.

In a possible embodiment of the present disclosure, the processor is further configured to: collect the characteristic data of the driver IC of the to-be-debugged module; and create the standard gamma curve in accordance with the collected characteristic data of the driver IC of the to-be-debugged module.

In a possible embodiment of the present disclosure, the gamma tuning device further includes a programming device configured to perform a programming operation on the module after the gamma tuning.

In yet another aspect, the present disclosure provides in some embodiments a gamma tuning device, including: a comparison module configured to compare grayscale binding points of a to-be-debugged module with a standard gamma curve; a determination module configured to determine a to-be-tuned grayscale binding point from the grayscale binding points of the to-be-debugged module in accordance with a comparison result between the grayscale binding points of the to-be-debugged module and the standard gamma curve; and a tuning module configured to tune a grayscale brightness value of the to-be-tuned grayscale binding point in accordance with a target brightness value of the grayscale binding point on the standard gamma curve.

In a possible embodiment of the present disclosure, the comparison result comprises that the to-be-tuned grayscale binding point is inconsistent with a corresponding grayscale binding point on the standard gamma curve.

In a possible embodiment of the present disclosure, the comparison module is further configured to: compare grayscale brightness values of the grayscale binding points of the to-be-debugged module with corresponding brightness values on the standard gamma curve, or compare a gamma curve of the to-be-debugged module with the standard gamma curve, the gamma curve of the to-be-debugged module being created on the basis of the grayscale binding points of the to-be-debugged module.

In a possible embodiment of the present disclosure, the tuning module is further configured to: tune, in accordance with the target grayscale brightness value of the grayscale binding point on the standard gamma curve, the grayscale brightness value of the to-be-tuned grayscale binding point on the gamma curve of the to-be-debugged module in an iterative mode where the grayscale brightness value gradually approaches to the target grayscale brightness value.

In a possible embodiment of the present disclosure, the tuning module is further configured to: tune the grayscale brightness value of the to-be-tuned grayscale binding point on the gamma curve of the to-be-debugged module; compare the tuned grayscale brightness value of the grayscale binding point with the target grayscale brightness value of the grayscale binding point on the standard gamma curve; and in the case that the tuned grayscale brightness value is inconsistent with the target grayscale brightness value, tune the tuned grayscale brightness value gradually in accordance with the target grayscale brightness value, until the grayscale brightness value of the grayscale binding point is consistent with the target grayscale brightness value.

In a possible embodiment of the present disclosure, the gamma tuning device further includes an acquisition module configured to acquire the gamma curve of the to-be-debugged module.

In a possible embodiment of the present disclosure, the acquisition module is further configured to: perform white balance tuning on the to-be-debugged module; and acquire an R-component gamma curve, a G-component gamma curve and a B-component gamma curve of the to-be-debugged module after the white balance tuning.

In a possible embodiment of the present disclosure, the acquisition module is further configured to: determine a picture in accordance with characteristic data of a driver IC of the to-be-debugged module, and read from the picture a grayscale brightness value of a R component, a grayscale brightness value of a G component and a grayscale brightness value of a B component, the picture containing the grayscale brightness values of the respective grayscale binding points corresponding to the driver IC of the to-be-debugged module; and generate the R-component gamma curve, the G-component gamma curve and the B-component gamma curve of the to-be-debugged module in accordance with the grayscale brightness value of the R component, the grayscale brightness value of the G component and the grayscale brightness value of the B component.

In a possible embodiment of the present disclosure, the picture includes a monochromatic R region, a monochromatic G region and a monochromatic B region, and grayscale pictures of the grayscale binding points corresponding to the driver IC are arranged at the R region, the G region and the B region respectively.

In a possible embodiment of the present disclosure, the comparison module is further configured to: compare the R-component gamma curve, the G-component gamma curve and the B-component gamma curve of the to-be-debugged module with a standard R-component gamma curve, a standard G-component gamma curve and a standard B-component gamma curve of the standard gamma curve respectively, and the standard R-component gamma curve, the standard G-component gamma curve and the standard B-component gamma curve each having a gamma value of 2.2.

In a possible embodiment of the present disclosure, the gamma tuning device further includes: a collection module configured to collect the characteristic data of the driver IC of the to-be-debugged module; and a creation module configured to create the standard gamma curve in accordance with the collected characteristic data of the driver IC of the to-be-debugged module.

In a possible embodiment of the present disclosure, an absolute value of a difference between the tuned grayscale brightness value of the grayscale binding point and the target grayscale brightness value is smaller than or equal to a threshold, or an absolute value of a square of the difference between the tuned grayscale brightness value of the grayscale binding point and the target grayscale brightness value is smaller than or equal to a threshold.

In a possible embodiment of the present disclosure, the gamma tuning device further includes a programming module configured to perform a programming operation on the module after the gamma tuning.

DETAILED DESCRIPTION

The present disclosure will be described hereinafter in conjunction with the drawings and embodiments. The following embodiments are for illustrative purposes only, but shall not be used to limit the scope of the present disclosure.

Figure 1:
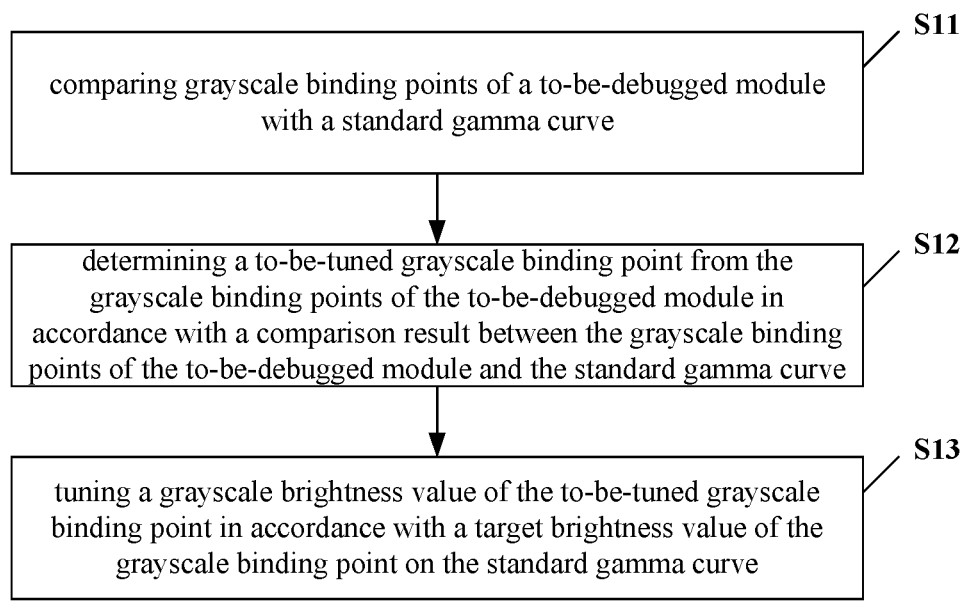
FIG. 1 is a flow chart of a gamma tuning method according to one embodiment of the present disclosure.

The present disclosure provides in some embodiments a gamma tuning method which, as shown in FIG. 1, includes the following steps.

Step S11: comparing grayscale binding points of a to-be-debugged module with a standard gamma curve.

In a possible embodiment of the present disclosure, grayscale brightness values of the grayscale binding points of the to-be-debugged module may be compared with corresponding brightness values on the standard gamma curve, or a gamma curve of the to-be-debugged module may be compared with the standard gamma curve. The gamma curve of the to-be-debugged module is created on the basis of the grayscale binding points of the to-be-debugged module. The grayscale binding point may be used to represent a tunable grayscale in a driver IC.

In a possible embodiment of the present disclosure, the standard gamma curve may be created in accordance with characteristic data of the driver IC of the to-be-debugged module. It should be appreciated that, the standard gamma curve may also be created in accordance with any other parameters of a display device, or a specific standard curve may be used for comparison.

Step S12: determining a to-be-tuned grayscale binding point from the grayscale binding points of the to-be-debugged module in accordance with a comparison result between the grayscale binding points of the to-be-debugged module and the standard gamma curve.

In a possible embodiment of the present disclosure, the comparison result comprises that the to-be-tuned grayscale binding point is inconsistent with the standard gamma curve. In other words, in the case that a gamma curve of the to-be-debugged module is inconsistent with the standard gamma curve, it is able to determine the to-be-tuned grayscale binding point on the gamma curve of the to-be-debugged module.

Step S13: tuning a grayscale brightness value of the to-be-tuned grayscale binding point in accordance with a target brightness value of the grayscale binding point on the standard gamma curve.

It should be appreciated that, a tuned grayscale brightness value of the grayscale binding point may equal to or approximately equal to the target grayscale brightness value. For example, an absolute value of a difference between the tuned grayscale brightness value of the grayscale binding point and the target grayscale brightness value is smaller than or equal to a threshold, or an absolute value of a square of the difference between the tuned grayscale brightness value of the grayscale binding point and the target grayscale brightness value is smaller than or equal to a threshold. A person skilled in the art may determine the threshold according to the practical need, e.g., it may be a positive number approximating to 0.

Figure 2:
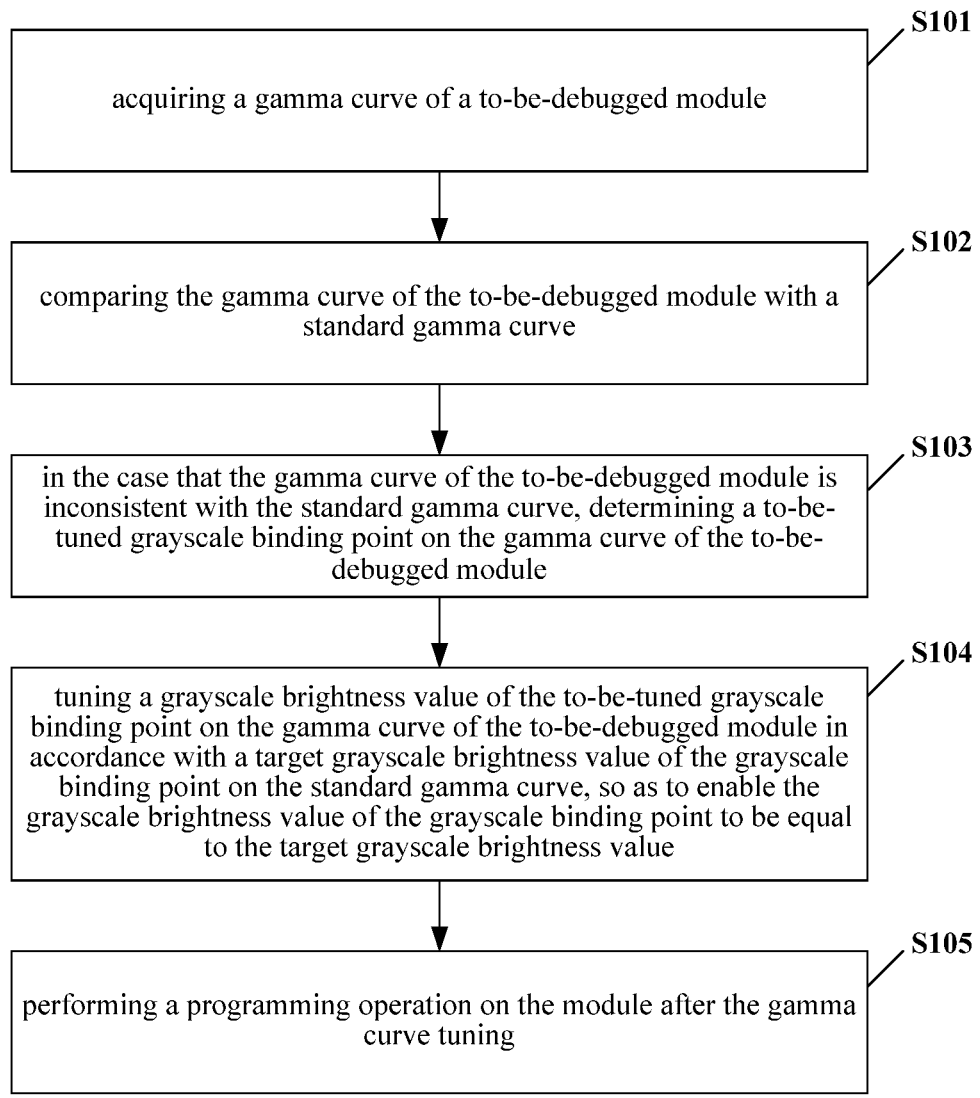
FIG. 2 is a flow chart of the gamma tuning method according to one embodiment of the present disclosure.

For example, as shown in FIG. 2, the gamma tuning method may include the following steps.

Step S101: acquiring a gamma curve of the to-be-debugged module.

The gamma curve may be used to represent a nonlinear relationship between a display brightness value and an input voltage of the to-be-debugged module, or a nonlinear relationship between the display brightness value and any other input signal of the to-be-debugged module. In a possible embodiment of the present disclosure, the gamma curve includes an R-component gamma curve, a G-component gamma curve and a B-component gamma curve. In Step S101, white balance tuning may be performed on the to-be-debugged module, e.g., L255 white balance tuning may be performed using a relevant algorithm. Then, RGB components may be read from the module after the white balance tuning, so as to acquire the gamma curve of the to-be-debugged module.

To be specific, the white balance tuning may be performed on the to-be-debugged module, and a picture may be determined in accordance with characteristic data of the driver IC of the to-be-debugged module, and then a grayscale brightness value of the R component, a grayscale brightness value of the G component and a grayscale brightness value of the B component may be read from the picture. The picture may contain the grayscale brightness values of the respective grayscale binding points corresponding to the driver IC of the to-be-debugged module. Then, the R-component gamma curve, the G-component gamma curve and the B-component gamma curve of the to-be-debugged module may be generated in accordance with the grayscale brightness value of the R component, the grayscale brightness value of the G component and the grayscale brightness value of the B component.

The picture may include a monochromatic R region, a monochromatic G region and a monochromatic B region, and grayscale pictures of the grayscale binding points corresponding to the driver IC may be arranged at the R region, the G region and the B region respectively. It should be appreciated that, a specific format of the picture is not particularly defined in the embodiments of the present disclosure.

In the embodiments of the present disclosure, after the white balance tuning, on the basis of lightening information about special RGB patterns read by a computer, it is able to conveniently acquire brightness information about the respective RGB grayscale binding points, without any necessary to provide a plurality of pictures. Due to the rapid data processing capability of the computer, it is able to acquire information about the grayscale brightness values of these three colors (i.e. RGB) merely through one picture, thereby to provide data for the subsequent comparison with the standard gamma curve.

In addition, through the white balance tuning in combination with 3 gamma curves (i.e., the R-component gamma curve, the G-component gamma curve and the B-component gamma curve), it is able to ensure the final gamma tuning accuracy and the yield of the product, thereby to meet the requirements on mass production.

Step S102: comparing the gamma curve of the to-be-debugged module with the standard gamma curve.

It should be appreciated that, the standard gamma curve is created on the basis of the characteristic data of the driver IC of the to-be-debugged module. In a possible embodiment of the present disclosure, the characteristic data of the driver IC may include, but not limited to, performance data and/or specification requirement data of the driver IC. The performance data may be data related to brightness, and the specification requirement data may be data related to the structure of the driver IC.

In a possible embodiment of the present disclosure, prior to Step S101 or S102, the characteristic data of the driver IC of the to-be-debugged module may be collected, and a standard gamma curve database may be created in accordance with the collected characteristic data of the driver IC of the to-be-debugged module. The standard gamma curve database may include one or more standard gamma curves. For example, the standard gamma curve database may be created through mathematical statistics in accordance with the collected characteristic data of the driver IC of the to-be-debugged module.

The standard gamma curve may correspond to a specific gamma value, e.g., it may correspond to, but not limited to, the gamma value 1, 2, 2.2 or 3. A person skilled in the art may understands that, in the case that the gamma value is 2.2, the grayscale brightness values may be identified by human eyes progressively in an equidistant manner. Hence, the standard gamma curve may include a standard R2.2 gamma curve, a standard G2.2 gamma curve, and a standard B2.2 gamma curve.

Step S103: in the case that the gamma curve of the to-be-debugged curve of the to-be-debugged module is inconsistent with the standard gamma curve, determining the to-be-tuned grayscale binding point on the gamma curve of the to-be-debugged module.

For example, in the case that an absolute value of a difference between a grayscale brightens value of a grayscale binding point and the corresponding target grayscale brightness value on the standard gamma curve is greater than a threshold, this grayscale binding point may be determined as the to-be-tuned grayscale binding point. The threshold may be determined according to the practical need, e.g., a positive number approximating to 0. For another example, in the case that a grayscale brightness value of a grayscale binding point is not equal to the corresponding target grayscale brightness value on the standard gamma curve, this grayscale binding point may be determined as the to-be-tuned grayscale binding point.

In the embodiments of the present disclosure, the gamma curve of the to-be-debugged module is compared with the standard gamma curve, so it is able to determine the to-be-tuned grayscale binding point, and tune the grayscale brightness values of the individual grayscale binding points (the to-be-tuned grayscale binding points) each time while ensure the tuning accuracy without any necessary to tune the grayscale brightness values of all the grayscale binding points in accordance with the characteristic data of the driver IC upon tuning each module, thereby to prevent the repetitive work.

For example, the R-component gamma curve, the G-component gamma curve and the B-component gamma curve of the to-be-debugged module may be compared with the standard R2.2 gamma curve, the standard G2.2 gamma curve and standard B2.2 gamma curve.

Step S104: tuning the grayscale brightness value of the to-be-tuned grayscale binding point on the gamma curve of the to-be-debugged module in accordance with the target grayscale brightness value of the grayscale binding point on the standard gamma curve, so as to enable the grayscale brightness value of the to-be-tuned grayscale binding point to be equal to the target grayscale brightness value.

In a possible embodiment of the present disclosure, in Step S104, the grayscale brightness value of the to-be-tuned grayscale binding point on the gamma curve of the to-be-debugged module may be tuned in an iterative mode where the grayscale brightness value gradually approaches to the target grayscale brightness value, so as to enable the grayscale brightness value of the to-be-tuned grayscale binding point to be equal to the target grayscale brightness value, thereby to ensure the gamma tuning accuracy. In addition, it is able to remarkably reduce the time for the gamma tuning, and improve the module tuning efficiency.

To be specific, the grayscale brightness value of the to-be-tuned grayscale binding point on the gamma curve of the to-be-debugged module may be tuned, then the tuned grayscale brightness value of the grayscale binding point may be compared with the target grayscale brightness value of the grayscale binding point on the standard gamma curve, and in the case that the tuned grayscale brightness value is inconsistent with the target grayscale brightness value, it may be gradually tuned in accordance with the target grayscale brightness value until the grayscale brightness value of the grayscale binding point is consistent with the target grayscale brightness value.

Step S105: performing a programming operation on the module after the gamma curve tuning.

In a possible embodiment of the present disclosure, after the gamma curve tuning, A Multi-Time Programmable (MTP) operation may be performed on the module, so as to complete the current gamma tuning.

In the embodiments of the present disclosure, the to-be-tuned grayscale binding point may be determined in accordance with the standard gamma curve, and then the to-be-tuned grayscale binding point may be tuned in accordance with the target grayscale brightness value of the grayscale binding point on the standard gamma curve, so as to enable the grayscale brightness value of the to-be-tuned grayscale binding point to be equal to the target grayscale brightness value. As a result, it is able to prevent the tuning on the grayscale brightness values of the grayscale binding points that have met the requirements and merely modify the grayscale brightness values of the individual grayscale binding points each time, thereby to prevent the occurrence of a large number of repetitive works and improve the gamma tuning efficiency. In addition, it is also able to ensure the gamma tuning accuracy and meet the requirements on mass production.

Figure 3:
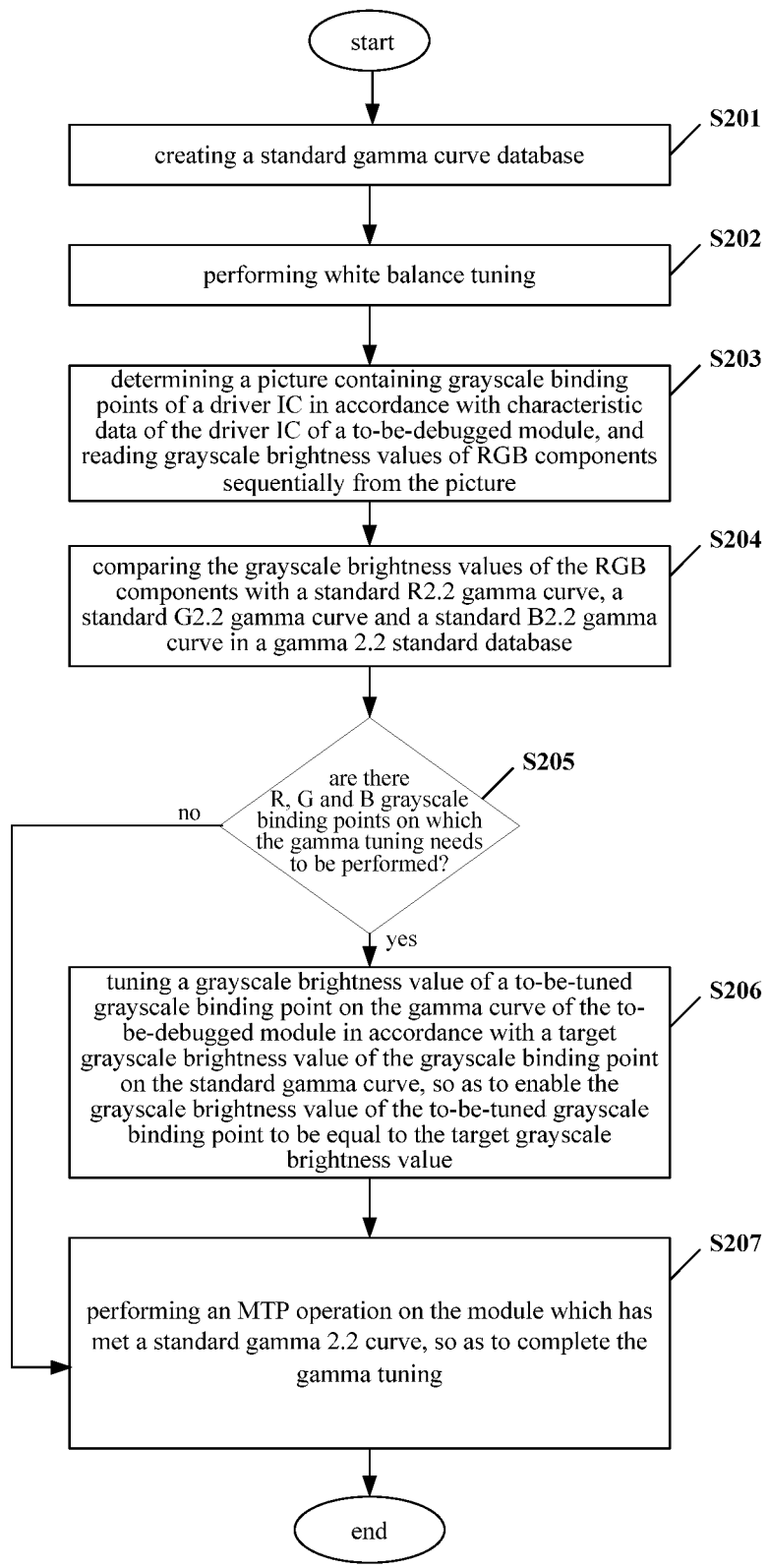
FIG. 3 is a flow chart of the gamma tuning method according to one embodiment of the present disclosure.

For another example, as shown in FIG. 3, the gamma tuning method may include the following steps.

Step S201: creating a standard gamma curve database.

To be specific, the characteristic data of the driver IC of the to-be-debugged module may be collected, and then the standard gamma curve database may be created in accordance with the collected characteristic data of the driver IC.

In the embodiments of the preset disclosure, the standard gamma curve database is created in accordance with the collected characteristic data of the driver IC of the to-be-debugged module, so it is able for the respective standard gamma curves in the standard gamma curve database (including, e.g., the standard R-component gamma curve, the standard G-component gamma curve and the standard B-component gamma curve) to reflect the characteristics of the driver IC of the to-be-debugged module in a better manner, thereby to improve the gamma tuning accuracy.

A gamma 2.2 standard database will be taken as an example hereinafter. At first, the characteristic data of the driver IC of the to-be-debugged module may be collected, and then the gamma 2.2 standard database may be created in accordance with the characteristic data of the driver IC. The gamma 2.2 standard database mainly includes brightness information about white (W), red (R), green (G) and blue (B) grayscale binding points. It should be appreciated that, the standard databases with any other gamma values may be created in a similar way, which will thus not be particularly defined herein.

Step S202: performing white balance tuning, so as to determine a characteristic reference of the to-be-debugged module.

To be specific, L255 white balance tuning may be performed so as to determine the characteristic reference of the to-be-debugged module. The L255 white (full white) balance tuning may be used to detect various defects of a backlight source.

Step S203: determining a picture including the grayscale binding points of the driver IC in accordance with the characteristic data of the driver IC of the to-be-debugged module, and reading the grayscale brightness values of the RGB components sequentially from the picture.

The picture may contain the grayscale brightness values of the respective grayscale binding points of the driver IC of the to-be-debugged module.

Step S204: comparing the grayscale brightness values of the RGB components with the standard R2.2 gamma curve, the standard G2.2 gamma curve and the standard B2.2 gamma curve in the gamma 2.2 standard database.

Step S205: determining the R, G and B grayscale binding points on which the gamma tuning needs to be performed, and determining the grayscale brightness values of the to-be-tuned grayscale binding points.

It should be appreciated that, in Steps S202 to S205, through the white balance tuning and the 3-gamma tuning, it is able to significantly reduce the time for the gamma tuning, thereby to improve the yield of the product.

Figure 5:
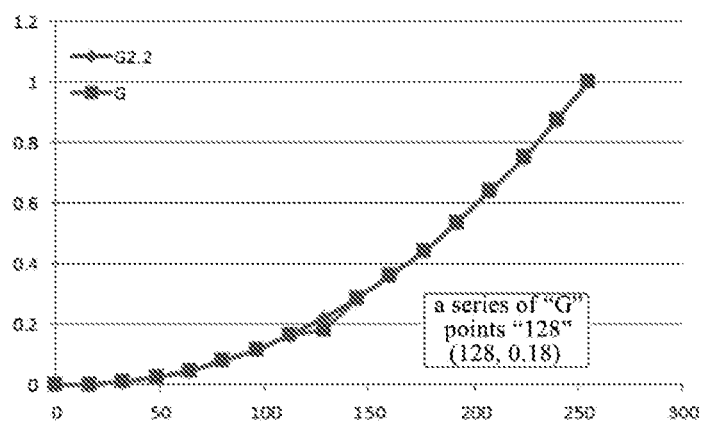
FIG. 5 is a schematic view showing the tuning of a G-component gamma curve according to one embodiment of the present disclosure.
Figure 6:
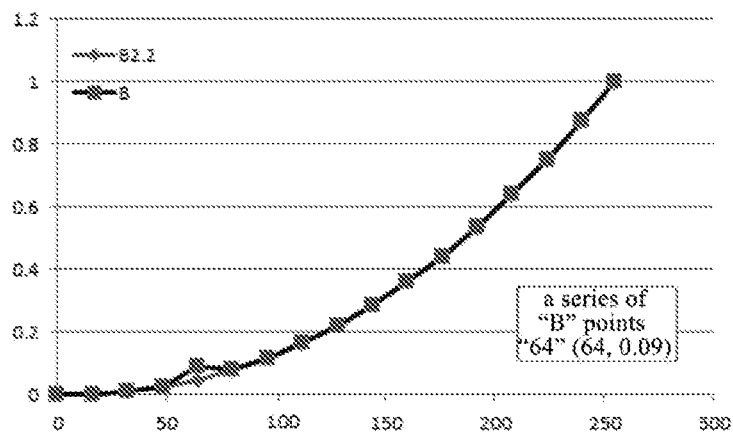
FIG. 6 is a schematic view showing the tuning of a B-component gamma curve according to one embodiment of the present disclosure.

For example, after Step S205, the grayscales whose grayscale brightness values need to be tuned may include R224 (see FIG. 4), G128 (see FIG. 5) and B64 (see FIG. 6). At this time, it is merely necessary to tune the grayscale brightness values of these three grayscale binding points, rather than tuning the other grayscale binding points. As a result, it is able to significantly reduce the number of works, thereby to remarkably improve the tuning efficiency.

Step S206: tuning the grayscale brightness value of the to-be-tuned grayscale binding point on the gamma curve of the to-be-debugged module in accordance with the target grayscale brightness value of the grayscale binding point on the standard gamma curve, so as to enable the grayscale brightness value of the to-be-tuned grayscale binding point to be equal to the target grayscale brightness value.

Step S207: performing an MTP operation on the module that has met the standard gamma 2.2 curve, so as to complete the current gamma tuning.

Figure 7:
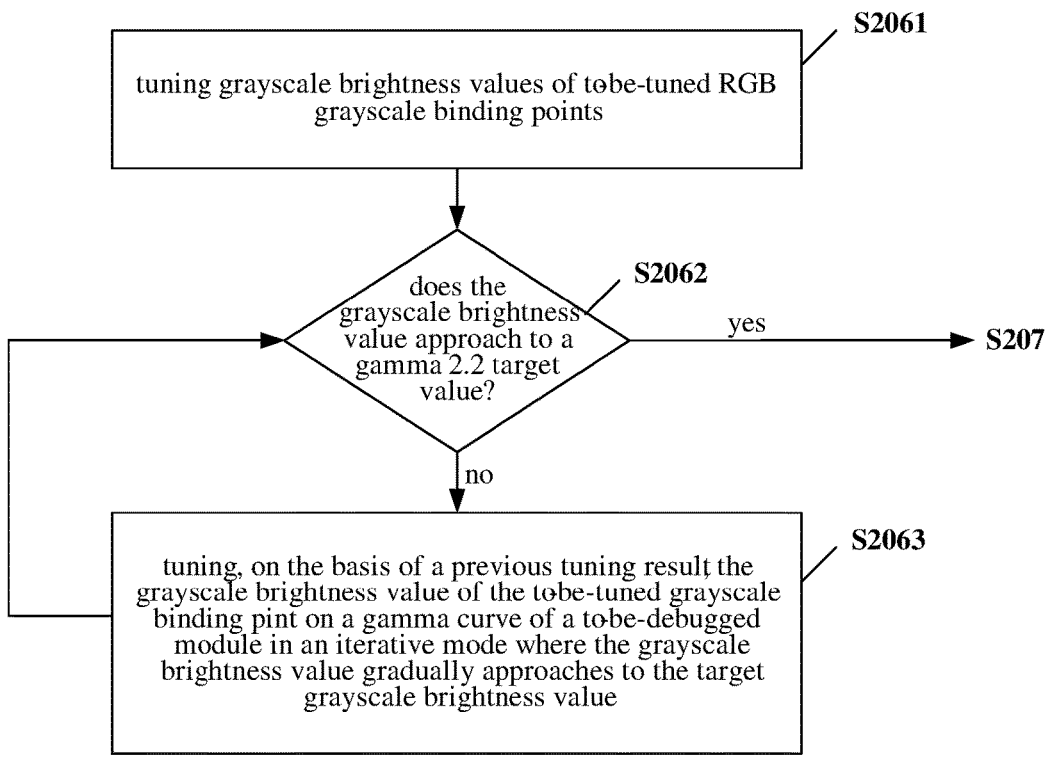
FIG. 7 is a flow chart of a method for tuning grayscale brightness values of RGB grayscale binding points according to one embodiment of the present disclosure.

As shown in FIG. 7, in a possible embodiment of the present disclosure, Step S206 may include the following steps.

Step S2061: tuning the grayscale brightness values of the to-be-tuned RGB grayscale binding points.

In Step S205, the to-be-tuned grayscale binding points (e.g., R224, G128 and B64) have been determined through the comparison with the standard RGB gamma 2.2 curves. In Step S2061, the grayscale brightness values of the RGB grayscale binding points may be tuned for the first time. It should be appreciated that, at this time, a tuning range toward the target grayscale brightness value may be predetermined.

Step S2062: comparing the tuned grayscale brightness value with the target grayscale brightness value, determining whether or not the tuned grayscale brightness value approaches to the gamma 2.2 target grayscale brightness value, in the case that a determination result is yes, proceeding to Step S207, and in the case that the determination result is not, proceeding to Step S2063.

Step S2063: in the case that the tuned grayscale brightness value is still inconsistent with the target grayscale brightness value, performing the gamma tuning continuously, i.e., tuning, on the basis of the previous tuning, the grayscale brightness value of the to-be-tuned grayscale binding point on the gamma curve of the to-be-debugged module in an iterative mode where the grayscale brightness value gradually approaches to the target grayscale brightness value, and returning to Step S2062 until the tuned grayscale brightness value is consistent with the target grayscale brightness value.

Figure 4:
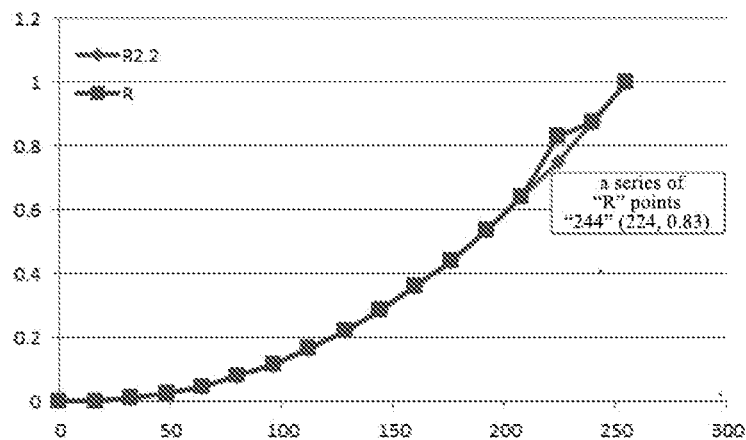
FIG. 4 is a schematic view showing the tuning of an R-component gamma curve according to one embodiment of the present disclosure.
Figure 8:
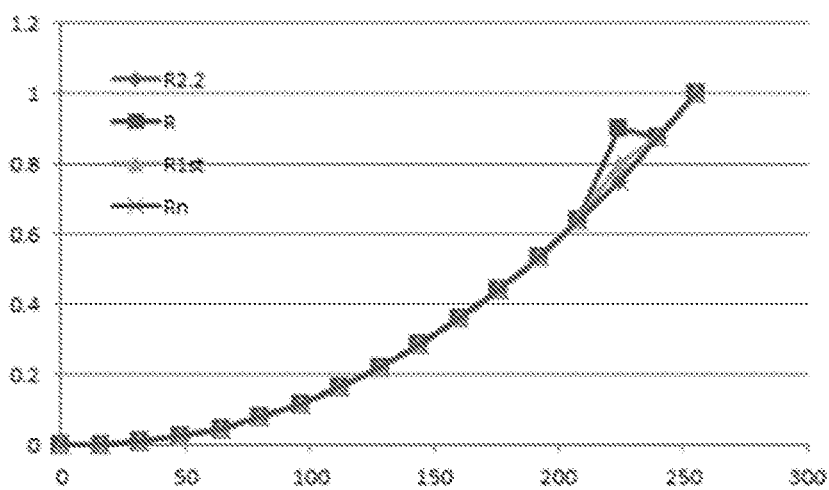
FIG. 8 is a schematic view showing the tuning of the R-component gamma curve in an iterative mode according to one embodiment of the present disclosure.

Referring to FIGS. 4 to 6, the grayscales whose grayscale brightness values need to be tuned are R224, G128 and B64. At this time, it is merely necessary to tune the grayscale brightness values of these three grayscale binding points, rather than the other grayscale binding points. As a result, it is able to significantly reduce the number of works. An iterative algorithm in numerical analysis may be used for the tuning, and it is able to tune, in accordance with the product characteristics, the grayscale brightness value of the grayscale binding point to the target grayscale brightness value merely through a few of tunings. As shown in FIG. 8, taking R224 as an example, R1st represents a first gamma tuning result, and during the second gamma tuning, the grayscale brightness value of the grayscale binding point may gradually approach to the target grayscale brightness value on the basis of the first gamma tuning result, until the grayscale brightness value is equal to the target grayscale brightness value.

Figure 9:
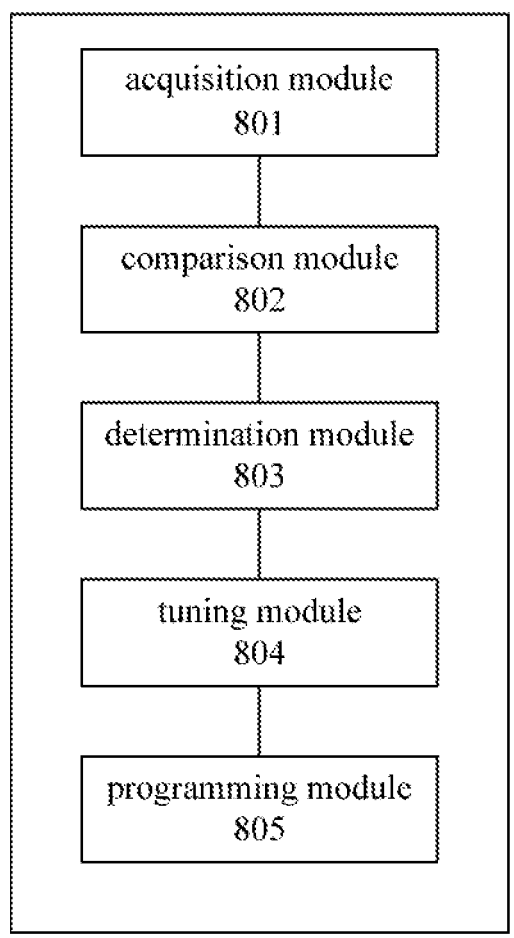
FIG. 9 is a schematic view showing a gamma tuning device according to one embodiment of the present disclosure.

As shown in FIG. 9, the present disclosure further provides in some embodiments a gamma tuning device, including: a comparison module 802 configured to compare grayscale binding points of a to-be-debugged module with a standard gamma curve; a determination module 803 configured to determine a to-be-tuned grayscale binding point from the grayscale binding points of the to-be-debugged module in accordance with a comparison result between the grayscale binding points of the to-be-debugged module and the standard gamma curve; and a tuning module 804 configured to tune a grayscale brightness value of the to-be-tuned grayscale binding point in accordance with a target brightness value of the grayscale binding point on the standard gamma curve.

In a possible embodiment of the present disclosure, the comparison module may compare grayscale brightness values of the grayscale binding points of the to-be-debugged module with corresponding brightness values on the standard gamma curve, or compare a gamma curve of the to-be-debugged module with the standard gamma curve. The gamma curve of the to-be-debugged module may be created on the basis of the grayscale binding points of the to-be-debugged module, and the standard gamma curve may be created on the characteristic data of the driver IC of the to-be-debugged module.

In a possible embodiment of the present disclosure, in the case that the gamma curve of the to-be-debugged module is inconsistent with the standard gamma curve, the determination module 803 may determine the to-be-tuned grayscale binding point on the gamma curve of the to-be-debugged module.

In a possible embodiment of the present disclosure, the tuning module may tune the grayscale brightness value of the to-be-tuned grayscale binding point to the target grayscale brightness value.

According to the embodiments of the present disclosure, the to-be-tuned grayscale binding point may be determined in accordance with the standard gamma curve, and then the grayscale brightness value of the to-be-tuned grayscale binding point may be tuned in accordance with the target grayscale brightness value of the grayscale binding point on the standard gamma curve, so as to enable the grayscale brightness value to be equal to the target grayscale brightness value. As a result, it is able to prevent the tuning on the grayscale brightness values of the grayscale binding points that have met the requirements and merely modify the grayscale brightness values of the individual grayscale binding points each time, thereby to prevent the occurrence of a large number of repetitive works and improve the gamma tuning efficiency. In addition, it is also able to ensure the gamma tuning accuracy and meet the requirements on mass production.

In a possible embodiment of the present disclosure, the tuning module 804 is further configured to: tune, in accordance with the target grayscale brightness value of the grayscale binding point on the standard gamma curve, the grayscale brightness value of the to-be-tuned grayscale binding point on the gamma curve of the to-be-tuned module in an iterative mode where the grayscale brightness value gradually approaches to the target grayscale brightness value, so as to enable the grayscale brightness value of the to-be-tuned grayscale binding point to be equal to the target grayscale brightness value. As a result, it is also able to ensure the gamma tuning accuracy. In addition, it is able to significantly reduce the time for the gamma tuning, thereby to remarkably improve the tuning efficiency.

In a possible embodiment of the present disclosure, the tuning module 804 is further configured to: tune the grayscale brightness value of the to-be-tuned grayscale binding point on the gamma curve of the to-be-debugged module; compare the tuned grayscale brightness value of the grayscale binding point with the target grayscale brightness value of the grayscale binding point on the standard gamma curve; and in the case that the tuned grayscale brightness value is inconsistent with the target grayscale brightness value, tune the tuned grayscale brightness value gradually in accordance with the target grayscale brightness value, until the grayscale brightness value of the grayscale binding point is consistent with the target grayscale brightness value.

In a possible embodiment of the present disclosure, the gamma tuning device further includes: a collection module configured to collect the characteristic data of the driver IC of the to-be-debugged module; and a creation module configured to create a standard gamma curve database in accordance with the collected characteristic data of the driver IC of the to-be-debugged module. The standard gamma curve database includes one or more standard gamma curves.

In a possible embodiment of the present disclosure, the gamma tuning device further includes an acquisition module 801 configured to acquire the gamma curve of the to-be-debugged module. The acquisition module 801 is further configured to: perform white balance tuning on the to-be-debugged module; and acquire an R-component gamma curve, a G-component gamma curve and a B-component gamma curve of the to-be-debugged module after the white balance tuning.

In a possible embodiment of the present disclosure, the acquisition module 801 is further configured to: determine a picture in accordance with characteristic data of a driver IC of the to-be-debugged module, and read from the picture a grayscale brightness value of a R component, a grayscale brightness value of a G component and a grayscale brightness value of a B component, the picture containing the grayscale brightness values of the respective grayscale binding points corresponding to the driver IC of the to-be-debugged module; and generate the R-component gamma curve, the G-component gamma curve and the B-component gamma curve of the to-be-debugged module in accordance with the grayscale brightness value of the R component, the grayscale brightness value of the G component and the grayscale brightness value of the B component.

In the embodiments of the present disclosure, after the white balance tuning, on the basis of lightening information about special RGB patterns read by a computer, it is able to conveniently acquire brightness information about the respective RGB grayscale binding points, without any necessary to provide a plurality of pictures. Due to the rapid data processing capability of the computer, it is able to acquire information about the RGB grayscale brightness values merely through one picture, thereby to provide data for the subsequent comparison with the standard gamma curve. In addition, through the white balance tuning in combination with 3 gamma curves (i.e., the R-component gamma curve, the G-component gamma curve and the B-component gamma curve), it is able to ensure the final gamma tuning accuracy and the yield of the product, thereby to meet the requirements on mass production.

In a possible embodiment of the present disclosure, the picture includes a monochromatic R region, a monochromatic G region and a monochromatic B region, and grayscale pictures of the grayscale binding points corresponding to the driver IC are arranged at the R region, the G region and the B region respectively.

In a possible embodiment of the present disclosure, the comparison module 802 is further configured to compare the R-component gamma curve, the G-component gamma curve and the B-component gamma curve of the to-be-debugged module with a standard R-component gamma curve, a standard G-component gamma curve and a standard B-component gamma curve of the standard gamma curve respectively, wherein each of the standard R-component gamma curve, the standard G-component gamma curve and the standard B-component gamma curve has a gamma value of 2.2.

In a possible embodiment of the present disclosure, the gamma tuning device further includes a programming module 805 configured to perform a programming operation on the module after the gamma curve tuning.

Figure 10:
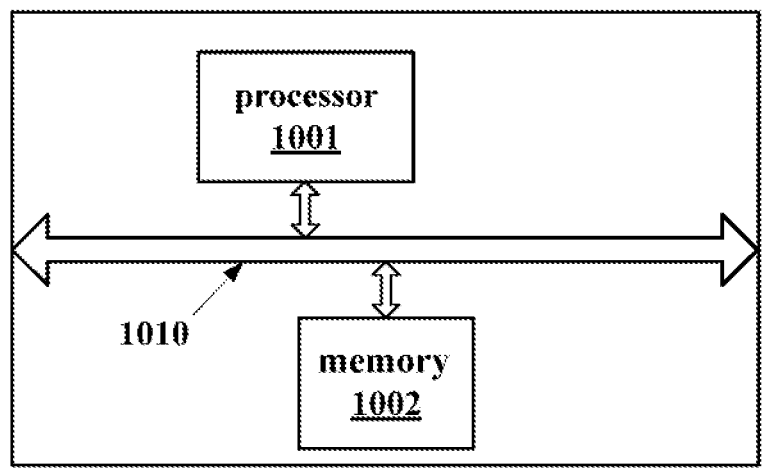
FIG. 10 is a schematic view showing the gamma tuning device according to one embodiment of the present disclosure.

The above-mentioned steps may be implemented by the gamma tuning device in FIG. 10. As shown in FIG. 10, the gamma tuning device includes a processor 1001 and a memory 1002. The processor 1001 is configured to control operations of a display processing device. The memory 1002 may include a Read Only Memory (ROM) or a Random Access Memory (RAM), and it is configured to provide instructions and data to the processor 1001. A part of the memory 1002 may further includes a Non-Volatile Random Access Memory (NVRAM). The processor 1001 is coupled to the memory 1002 through a bus system 1010. Apart from a data bus, the bus system 1010 may further include a power bus, a control bus and a status signal bus. For clarification, all buses in FIG. 10 are marked as the bus system 1010.

The processor 1001 may be an IC having a signal processing capability. During the implementation, the above-mentioned steps may be executed by an integrated logic circuit of hardware or software instructions in the processor 1001. The processor 1001 may be a general-purpose processor, including a Central Processing Unit (CPU), a Network Processor (NP), a Digital Signal Processor (DSP), an Application Specific Integrated Circuit (ASIC), a Field Programmable Gate Array (FPGA), or any other programmable logic element, discrete gate or transistor logic element, or discrete hardware assembly, so as to implement or execute the method, the steps and the procedures in the embodiments of the present disclosure. The general-purpose processor may be a microprocessor or any other conventional processor.

In a possible embodiment of the present disclosure, the processor 1001 is configured to read the instructions or data stored in the memory 1002 so as to: compare grayscale binding points of a to-be-debugged module with a standard gamma curve; determine a to-be-tuned grayscale binding point from the grayscale binding points of the to-be-debugged module in accordance with a comparison result between the grayscale binding points of the to-be-debugged module and the standard gamma curve; and tune a grayscale brightness value of the to-be-tuned grayscale binding point in accordance with a target brightness value of the grayscale binding point on the standard gamma curve.

Specific examples may refer to the aforementioned embodiments, and thus will not be particularly defined herein. In addition, the gamma tuning device in FIG. 10 may further include a programming device configured to perform a programming operation on the module after the gamma tuning (e.g. the gamma curve tuning).

It should be appreciated that, the expression "one embodiment" mentioned in the context means that the specific features, structures or characteristics related to the embodiment is included in at least one embodiment of the present disclosure, so the expression "in one embodiment" or "according to one embodiment" may not necessarily refer to an identical embodiment. In addition, these specific features, structures or characteristics may be combined in one or more embodiments in any appropriate manner.

It should be further appreciated that, serial numbers of the steps are not used to represent an order of the steps. In other words, the order of the steps shall be determined in accordance with their functions as well as inherent logic relationship, but shall not be used to define the implementation thereof in any form.

It should be further appreciated that, the term "and/or" may merely describe a relationship between associated objects, and it may be used to represent three relationships. For example, "A and/or B" may be used to represent three situations, i.e., where merely A exists, where both A and B exist, and where merely B exists. In addition, the symbol "I" between two objects usually means that there is an "or" relationship between the two objects.

It should be further appreciated that, the expression "B corresponding to A" means that B is related to A and may be determined in accordance with A. It should be further appreciated that, in the case that B is determined in accordance with A, it means that B may be determined in accordance with merely A or B may be determined in accordance with A and/or any other information.

It should be further appreciated that, the method and the device in the embodiments of the present disclosure may be implemented in any other ways. For example, the above-mentioned embodiments involving the device are merely for illustrative purposes, and the members of the device are divided merely on the basis of their logic functions. In actual use, these members may be divided in any other ways, e.g., a plurality of units or components may be combined or integrated into another system, or some features may be omitted or not executed. In addition, for the so-called "coupling", "directly coupling" or "in communication with", interfaces may be provided. In the case that the devices or units are indirectly coupled to each other or in communication with each other, they may be electrically or mechanically connected to each other, or in any other forms.

In addition, the functional units in the embodiments of the present disclosure may be integrated into one processing unit, or each unit may exist independently, or two or more units may be integrated into one unit. The integrated units may be implemented by hardware, or by hardware and a software functional unit.

The integrated units implemented by software functional unit may be stored in a computer-readable storage medium, which may include instructions so as to enable a computer device (e.g., a personal computer, a server or a network device) to execute parts of the steps of the method mentioned in the embodiments of the present disclosure. The storage medium may include any medium capable of storing therein a program code, e.g., a Universal Serial Bus (USB) flash disk, a mobile hard disk drive (HDD), a ROM, a RAM, a magnetic disk or an optical disk.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A gamma tuning method, comprising:
comparing grayscale binding points of a to-be-debugged module with a standard gamma curve;
determining a to-be-tuned grayscale binding point from the grayscale binding points of the to-be-debugged module in accordance with a comparison result between the grayscale binding points of the to-be-debugged module and the standard gamma curve; and
tuning a grayscale brightness value of the to-be-tuned grayscale binding point in accordance with a target brightness value of the grayscale binding point on the standard gamma curve,
wherein the step of tuning the grayscale brightness value of the to-be-tuned grayscale binding point in accordance with the target grayscale brightness value of the grayscale binding point on the standard gamma curve comprises:
tuning, in accordance with the target grayscale brightness value of the grayscale binding point on the standard gamma curve, the grayscale brightness value of the to-be-tuned grayscale binding point on the gamma curve of the to-be-debugged module in an iterative mode where the grayscale brightness value gradually approaches the target grayscale brightness value.

2. The gamma tuning method according to claim 1, wherein the comparison result comprises that the to-be-tuned grayscale binding point is inconsistent with the standard gamma curve.

3. The gamma tuning method according to claim 1, wherein the step of tuning, in accordance with the target grayscale brightness value of the grayscale binding point on the standard gamma curve, the grayscale brightness value of the to-be-tuned grayscale binding point on the gamma curve of the to-be-debugged module in the iterative mode where the grayscale brightness value gradually approaches the target grayscale brightness value comprises:
tuning the grayscale brightness value of the to-be-tuned grayscale binding point on the gamma curve of the to-be-debugged module;
comparing the tuned grayscale brightness value of the grayscale binding point with the target grayscale brightness value of the grayscale binding point on the standard gamma curve; and
in the case that the tuned grayscale brightness value is inconsistent with the target grayscale brightness value, tuning the tuned grayscale brightness value gradually in accordance with the target grayscale brightness value, until the grayscale brightness value of the grayscale binding point is consistent with the target grayscale brightness value.

4. The gamma tuning method according to claim 1, wherein an absolute value of a difference between the tuned grayscale brightness value of the grayscale binding point and the target grayscale brightness value is smaller than or equal to a threshold; or an absolute value of a square of the difference between the tuned grayscale brightness value of the grayscale binding point and the target grayscale brightness value is smaller than or equal to a threshold.

5. The gamma tuning method according to claim 1, wherein the step of comparing the grayscale binding points of the to-be-debugged module with the standard gamma curve comprises:

comparing grayscale brightness values of the grayscale binding points of the to-be-debugged module with corresponding brightness values on the standard gamma curve; or comparing a gamma curve of the to-be-debugged module with the standard gamma curve, wherein the gamma curve of the to-be-debugged module is created on the basis of the grayscale binding points of the to-be-debugged module.

6. The gamma tuning method according to claim 5, wherein prior to the step of comparing the gamma curve of the to-be-debugged module with the standard gamma curve, the gamma tuning method further comprises:

performing white balance tuning on the to-be-debugged module; and acquiring an R-component gamma curve, a G-component gamma curve and a B-component gamma curve of the to-be-debugged module after the white balance tuning.

7. The gamma tuning method according to claim 6, wherein the step of acquiring the R-component gamma curve, the G-component gamma curve and the B-component gamma curve of the to-be-debugged module after the white balance tuning comprises:

determining a picture in accordance with characteristic data of a driver Integrated Circuit (IC) of the to-be-debugged module, and reading from the picture a grayscale brightness value of a R component, a grayscale brightness value of a G component and a grayscale brightness value of a B component, wherein the picture contains the grayscale brightness values of the respective grayscale binding points corresponding to the driver IC of the to-be-debugged module; and generating the R-component gamma curve, the G-component gamma curve and the B-component gamma curve of the to-be-debugged module in accordance with the grayscale brightness value of the R component, the grayscale brightness value of the G component and the grayscale brightness value of the B component.

8. The gamma tuning method according to claim 7, wherein the picture comprises a monochromatic R region, a monochromatic G region and a monochromatic B region, and grayscale pictures of the grayscale binding points corresponding to the driver IC are arranged at the R region, the G region and the B region respectively.

9. The gamma tuning method according to claim 6, wherein the step of comparing the gamma curve of the to-be-debugged module with the standard gamma curve comprises:

comparing the R-component gamma curve, the G-component gamma curve and the B-component gamma curve of the to-be-debugged module with a standard R-component gamma curve, a standard G-component gamma curve and a standard B-component gamma curve of the standard gamma curve respectively, wherein each of the standard R-component gamma curve, the standard G-component gamma curve and the standard B-component gamma curve has a gamma value of 2.2.

10. The gamma tuning method according to claim 5, wherein prior to the step of comparing the gamma curve of the to-be-debugged module with the standard gamma curve, the gamma tuning method further comprises:

collecting the characteristic data of the driver IC of the to-be-debugged module; and creating the standard gamma curve in accordance with the collected characteristic data of the driver IC of the to-be-debugged module.

11. A gamma tuning device, comprising a memory and a processor, wherein the memory is configured to store therein computer-readable instructions, and the processor is configured to execute the computer-readable instructions stored in the memory, to enable to:

compare grayscale binding points of a to-be-debugged module with a standard gamma curve; determine a to-be-tuned grayscale binding point from the grayscale binding points of the to-be-debugged module in accordance with a comparison result between the grayscale binding points of the to-be-debugged module and the standard gamma curve; and tune a grayscale brightness value of the to-be-tuned grayscale binding point in accordance with a target brightness value of the grayscale binding point on the standard gamma curve, and tune, in accordance with the target grayscale brightness value of the grayscale binding point on the standard gamma curve, the grayscale brightness value of the to-be-tuned grayscale binding point on the gamma curve of the to-be-debugged module in an iterative mode where the grayscale brightness value gradually approaches the target grayscale brightness value.

12. The gamma tuning device according to claim 11, wherein the processor is further configured to:

tune the grayscale brightness value of the to-be-tuned grayscale binding point on the gamma curve of the to-be-debugged module;

compare the tuned grayscale brightness value of the grayscale binding point with the target grayscale brightness value of the grayscale binding point on the standard gamma curve; and in the case that the tuned grayscale brightness value is inconsistent with the target grayscale brightness value, tune the tuned grayscale brightness value gradually in accordance with the target grayscale brightness value, until the grayscale brightness value of the grayscale binding point is consistent with the target grayscale brightness value.

13. The gamma tuning device according to claim 11, wherein the processor is further configured to:

compare grayscale brightness values of the grayscale binding points of the to-be-debugged module with corresponding brightness values on the standard gamma curve; or compare a gamma curve of the to-be-debugged module with the standard gamma curve, wherein the gamma curve of the to-be-debugged module is created on the basis of the grayscale binding points of the to-be-debugged module.

14. The gamma tuning device according to claim 13, wherein the processor is further configured to:

perform white balance tuning on the to-be-debugged module; and acquire an R-component gamma curve, a G-component gamma curve and a B-component gamma curve of the to-be-debugged module after the white balance tuning.

15. The gamma tuning device according to claim 14, wherein the processor is further configured to:
   determine a picture in accordance with characteristic data of a driver IC of the to-be-debugged module, and read from the picture a grayscale brightness value of a R component, a grayscale brightness value of a G component and a grayscale brightness value of a B component, wherein the picture contains the grayscale brightness values of the respective grayscale binding points corresponding to the driver IC of the to-be-debugged module; and
   generate the R-component gamma curve, the G-component gamma curve and the B-component gamma curve of the to-be-debugged module in accordance with the grayscale brightness value of the R component, the grayscale brightness value of the G component and the grayscale brightness value of the B component.

16. The gamma tuning device according to claim 15, wherein the picture comprises a monochromatic R region, a monochromatic G region and a monochromatic B region, and grayscale pictures of the grayscale binding points corresponding to the driver IC are arranged at the R region, the G region and the B region respectively.

17. The gamma tuning device according to claim 14, wherein the processor is further configured to:
   compare the R-component gamma curve, the G-component gamma curve and the B-component gamma curve of the to-be-debugged module with a standard R-component gamma curve, a standard G-component gamma curve and a standard B-component gamma curve of the standard gamma curve respectively, wherein each of the standard R-component gamma curve, the standard G-component gamma curve and the standard B-component gamma curve has a gamma value of 2.2.

18. The gamma tuning device according to claim 13, wherein the processor is further configured to:
   collect the characteristic data of the driver IC of the to-be-debugged module; and
   create the standard gamma curve in accordance with the collected characteristic data of the driver IC of the to-be-debugged module.

19. A gamma tuning method, comprising:
   collecting characteristic data of a driver IC of a to-be-debugged module;
   creating a standard gamma curve in accordance with the collected characteristic data of the driver IC of the to-be-debugged module;
   comparing grayscale binding points of the to-be-debugged module with the standard gamma curve;
   determining a to-be-tuned grayscale binding point from the grayscale binding points of the to-be-debugged module in accordance with a comparison result between the grayscale binding points of the to-be-debugged module and the standard gamma curve; and
   tuning a grayscale brightness value of the to-be-tuned grayscale binding point in accordance with a target brightness value of the grayscale binding point on the standard gamma curve.

* * * * *